3,142,679
PIPERAZINO ALKYLAMINO QUINOLINE DERIVATIVES AND THE MANUFACTURE THEREOF
Paul Anthony Barrett, Albert Gordon Caldwell, and Leslie Percy Walls, London, England, assignors to Burroughs Wellcome & Co. (U.S.A.) Inc., Tuckahoe, N.Y., a corporation of New York
No Drawing. Filed July 2, 1962, Ser. No. 207,107
Claims priority, application Great Britain Mar. 31, 1958
11 Claims. (Cl. 260—268)

The present invention relates to quinoline derivatives and the manufacture thereof.

This application is continuation-in-part of Serial No. 802,619, filed March 30, 1959, now abandoned.

It has been discovered that the bases of the Formula I and their acid addition salts containing pharmaceutically acceptable non-toxic anions have antiprotozoal activity. In particular, the compounds exhibit activity in experimental animals against malaria and the protozoa of the family Trypanosomidae which infect man (in particular Leishmania spp. and *Trypanosoma cruzi*), and have a relatively low toxicity to the host.

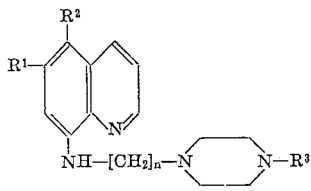

In this formula $R^1$ is selected from the class consisting of methoxy, ethoxy and hydroxy, $R^2$ is selected from the class consisting of hydrogen, methoxy and hydroxy, $R^3$ is selected from the class consisting of 2-hydroxyethyl, 2-hydroxypropyl, 3-hydroxypropyl and 3-hydroxybutyl, and $n$ is an integer from 3 to 6.

The definition of $R^3$ does not include the N'-phenylpiperazino, N'-benylpiperazino and the N'-unsubstituted piperazine analogues, for these compounds do not show the characteristic activity of the compounds of the Formula I. Table I shows the leishmanicidal activity of N'-phenylpiperazino and N'-benzylpiperazino compounds, while Table II shows the anti-malarial activity of an N'-unsubstituted piperazino compound, both in comparison of the Formula I.

TABLE I

Activities against *Leishmania donovani* in hamsters determined by the method of Goodwin, L. G. (1945), Trans. R. Soc. trop. Med. Hyg., 39, 133. All compounds were given subcutaneously in 5 daily doses of 50 mg./kg.

| | |
|---|---|
| 6 - methoxy - 8 - (3 - N' - phenylpiperazinopropylamino)quinoline dihydrochloride | — |
| 6 - methoxy - 8 - (3 - N' - benzylpiperazinopropylamino)quinoline trihydrochloride | — |
| 6 - methoxy - 8 - [4 - N' - (2 - hydroxyethyl)-piperazinobutylamino] quinoline trihydrochloride | +++ |
| 6 - methoxy - 8 - [3 - N' - (3 - hydroxybutyl)-piperazinopropylamino] quinoline trihydrochloride | +++ |

— indicates that the infection increased as in untreated controls.

+++ indicates that the infection was reduced to zero in most animals in the group.

TABLE II

Activities against *Plasmodium gallinaceum* in chicks determined by the method of Falco, E. O., Goodwin, L. G., Hitchings, G. H., Rollo, I. M. and Russell, P. B. (1951), Brit. J. Pharmacol., 6, 185.

| | |
|---|---|
| 6 - methoxy - 8 - (6 - piperazinohexylamino)quinoline trihydrochloride | No activity at 1 mg./kg. |
| 6 - methoxy - 8 - [6 - N' - (2 - hydroxypropyl) - piperazinohexylamino] quinoline trihydrochloride | Median effective dose 0.27 mg./kg. |
| 6 - methoxy - 8 - [3 - N' - (2 - hydroxypropyl) - piperazinopropylamino] quinoline trihydrochloride | Median effective dose 0.28 mg./kg. |

The compounds of the Formula I in which $R^1$ or $R^2$ is hydroxy are conveniently prepared by the acid hydrolysis of the corresponding alkoxy compounds. These alkoxy compounds consist of an 8-quinolylamino group, an alkylene chain and a piperazino group and are prepared by linking these portions by successive condensation reactions between the appropriate amines and alkylating agents. The alkylating agents are derivatives of the alkylene chain containing a halogen atom or a reactive grouping such as a hydrocarbon-sulphonyloxy group (for example a methanesulphonyloxy, benzylsulphonyloxy or p-toluenesulphonyloxy group).

The compounds of the Formula I in which $R^3$ is 2-hydroxyethyl or 2-hydroxypropyl are also conveniently prepared by the reaction of the corresponding N'-unsubstituted piperazino compound with ethylene oxide or propylene oxide.

A novel method has been found for the manufacture of an 8-aminoalkylaminoquinoline wherein an amide selected from the class consisting of the 8-aminoalkanoamidoquinolines, the 8-carboxamidoalkylaminoquinolines and the 8-carboxamidoalkanoamidoquinolines is reduced with lithium aluminium hydride.

This new method is convenient for the preparation of compounds of the Formula I and renders readily accessible those compounds of the general Formula I in which $n$ is 4, 5 or 6 (compounds in which $n$ is 4 are especially easily made by reducing compounds where the chain is —CO—$(CH_2)_2$—CO); the methods used formerly give extremely small yields of such products in which $n$ is 4 or 5 and sometimes give rather poor yields of such products in which $n$ is 6. The intermediates required for the preparation of compounds of the general Formula I in which $n$ is 4, 5 and 6 by the new method are generally more accessible than those required by methods formerly used. In general, the new method provides an excellent route for the preparation of pure products in good yields.

The invention is illustrated by the accompanying examples in which all temperatures are given in degrees centigrade.

*Example 1*

N-2-hydroxyethylpiperazine (39 g.), trimethylene chlorobromide (31.5 g.) and dry benzene (200 ml.) were heated under reflux for two hours. After cooling the benzene layer was separated and extracted with 3 N HCl (3×60 ml.). Addition of 10 N NaOH to the acid extract liberated a basic oil, which was isolated with ether, dried and distilled rapidly at high vacuum. N-3-chloropropyl-N'-2-hydroxyethylpiperazine distilled at 95–96° at 0.01 mm.; $n_D^{18}$ 1.5067. This substance (5.2 g.), 6-methoxy-8-aminoquinoline hydrochloride (5.7 g.) and n-propanol (45 ml.) were heated under reflux for 72 hours. Water was then added, followed by alkali, and the basic product thus liberated was isolated with ether, dried and distilled. After a small forerun of 6-methoxy-8-aminoquinoline, the product, 6-methoxy-8-[3-N'-(2-hydroxyethyl)piperazinopropylamino]quinoline, distilled at 233–238° under 0.05 mm. in good yield. The base was dissolved in sufficient N HCl to form a trihydrochloride, and the residue left after evaporation of water was crystallised from ethanol containing 5% of water. The trihydrochloride formed orange plates of the dihydrate, which melted with decomposition at 221–222°.

*Example 2*

6-methoxy-8-(3-chloropropylamino)quinoline (5 g.) and N-3-hydroxypropylpiperazine (4.3 g.) were heated in a bath at 130° for 6 hours. The melt was dissolved in dilute hydrochloric acid, the solution was made alkaline, and the liberated base was extracted with ether. The ether extract was washed with water and dried, ether was evaporated, and the residue was distilled at 0.01 mm. 6 - methoxy - 8 - [3 - N' - (3 - hydroxypropyl)piperazinopropylamino]quinoline distilled at 233°, and was converted into the trihydrochloride which crystallised from ethanol containing 12% of water by volume forming orange-yellow prismatic needles, melting point 234–236° with decomposition.

*Example 3*

6-methoxy - 8 - (4-chlorobutyramido)quinoline (49.3 g.) and N-2-hydroxyethylpiperazine (34.2 g.) were heated under reflux in benzene (200 ml.) for 24 hours. After cooling the benzene solution was decanted and extracted with 2 N acetic acid (3×90 ml.). The extract was made alkaline and the precipitated base isolated with benzene. Evaporation of the solvent left 6-methoxy-8-[4-N'-(2-hydroxyethyl)piperazino-1-oxobutylamino]quinoline as a gum which on absorption of water crystallised. The dry base (13.3 g.) was dissolved in dry tetrahydrofuran (133 ml.), and the solution was added during 20 minutes to a stirred suspension of lithium aluminium hydride (2.5 g.) in tetrahydrofuran (72 ml.). The reaction mixture was stirred for a further 2 hours at 40–50° and then cooled and decomposed by successive addition of water (3.6 ml.), 15% aqueous sodium hydroxide (3.6 ml.) and water (10.8 ml.). The tetrahydrofuran solution was separated by filtration, dried and distilled. There was a small forerun of 6-methoxy-8-aminoquinoline, presumably formed by cleavage of the chlorobutyramide at the condensation stage, followed by a good yield of 6-methoxy-8-[4-N'-(2-hydroxyethyl)piperazinobutylamino]quinoline at 248–249° at 0.5 mm. The trihydrochloride formed deep yellow leaflets, melting point 225–227° with decomposition.

Similarly, 6 - methoxy-8-(3-chloropropionamido)quinoline was condensed with N-3-hydroxypropylpiperazine to form 6-methoxy-8-[3-N'-(3 - hydroxypropyl)piperazino-1-oxo-propylamino]quinoline which crystallised from benzenecyclohexane in white leaflets melting at 132–133°, and which was reduced to 6-methoxy-8-[3-N'-(3-hydroxypropyl)piperazinopropylamino]quinoline, boiling point 233–237° at 0.01 mm. The trihydrochloride crystallised from aqueous ethanol (12% water by volume) in orange-yellow prismatic needles, melting point 234–236° with decomposition, identical with the product of Example 2.

*Example 4*

N-ethoxycarbonyl-N'-(3-hydroxybutyl)piperazine, boiling point 118–120°/0.1 mm. $n_D^{24}$ 1.4800, was obtained by the condensation of N - ethoxycarbonylpiperazine and 1-chlorobutan-3-ol, and hydrolysed with aqueous sodium hydroxide to N-(3-hydroxybutyl) piperazine, boiling point 138–139°/14 mm., which subsequently crystallised. This base and 6-methoxy-8-(3-chloropropionamido)quinoline gave, by the methods of Example 3, 6-methoxy-8 - [3 - N' - (3 - hydroxybutyl)piperazino - 1 - oxopropylamino]quinoline, which melted at 160–162° when recrystallised from ethanol, and 6-methoxy-8-[3-N'-(3-hydroxybutyl)piperazinopropylamino]quinoline, which crystallised from ethyl acetate in almost white needles, melting point 109°. The trihydrochloride crystallised from methanol in deep yellow prisms, melting point 241–242° with decomposition.

6 - methoxy - 8 - [4 - N' - (3 - hydroxybutyl)piperazino - 1 - oxobutylamino]quinoline and 6 - methoxy - 8 - [4 - N' - (3 - hydroxybutyl)piperazinobutylamino]quinoline were similarly prepared. The last-named base distilled at 232–239°/0.05 mm. and formed a trihydrochloride which crystallised from aqueous ethanol in orange-yellow elongated plates, melting point 229–231° with decomposition.

*Example 5*

6-methoxy-8-aminoquinoline (prepared from 30 g. of the hydrochloride), 5-bromovaleryl chloride (29.1 g.), anhydrous sodium carbonate (22 g.) and acetone (260 ml.) were heated under reflux for 2 hours. The acetone solution was separated by filtration and evaporated to dryness leaving a residue of crude 6-methoxy-8-(5-bromovalesamido)quinoline which crystallised from alcohol in fawn prisms, melting point 115–116.5°.

This amide (13.5 g.) and N-2-hydroxyethylpiperazine (7.8 g.) were heated at 100° for 4.5 hours. The gum was dissolved in 2 N acetic acid, and the base was liberated from this solution by addition of alkali. The base was extracted three times with hot benzene. With cooling, the extract deposited crystals of 6-methoxy-8-[5-N'-(2-hydroxyethyl)piperazino-1-oxopentylamino]quinoline in high yield as an oil which crystallised on standing. Recrystallisation of this amide from benzene furnished white leaflets, melting point 67–69°. Reduction of this substance by the method of Example 3 gave 6-methoxy-8-[5-N' - (2 - hydroxyethyl)piperazinopentylamino]quinoline, boiling point 262–264° at 0.1 mm. The trihydrochloride crystallised from ethanol in orange prisms, melting point 218–220° with decomposition.

Similarly, 6 - methoxy - 8 - (5 - bromovaleramido)quinoline was condensed with N-2-hydroxypropylpiperazine to form 6 - methoxy - 8 - [5-N'-(2-hydroxypropyl)piperazino - 1 - oxopentylamino]quinoline, which was reduced to 6 - methoxy - 8 -[5 - N' - (2 - hydroxypropyl)piperazinopentylamino]quinoline, boiling point 267–270° at 0.1 mm. The trihydrochloride crystallised from ethanol in rosettes of orange-yellow needles, melting point 219–220° with decomposition.

Similarly, 6-methoxy - 8 - (4-chlorobutyramido)quinoline (13.9 g.) was condensed with N-2-hydroxypropylpiperazine (10.8 g.) to form 6-methoxy - 8 - [4-N'-(2-hydroxy)piperazino - 1 - oxobutylamino]quinoline (17.2 g.) which was reduced to 6-methoxy - 8 - [4-N'-(2-hydroxypropyl)piperazinobutylamino]quinoline, boiling point 260° at 0.05 mm. The trihydrochloride crystallised from methanol in yellow needles, melting point 214–216° with decomposition.

Similarly, 6-methoxy - 8 - (4-chlorobutyramido)quinoline was condensed with N - 3 - hydroxypropylpiperazine to form 6-methoxy - 8 -[4-N'-(3-hydroxypropyl)piperazino - 1 - oxobutylamino]quinoline, which was reduced to 6-methoxy - 8 - [4-N'-(3-hydroxypropyl)piperazinobutylamino]quinoline, boiling point 244–246° at 0.01 mm. The trihydrochloride crystallised from 10% aqueous ethanol in orange-yellow prismatic needles of melting point 211–212° with decomposition.

*Example 6*

6-methoxy - 8 - aminoquinoline was isolated from its hydrochloride (45.6 g.) and dissolved in acetone (456 ml.). Dry sodium carbonate (40 g.) was added followed by a solution of 6-bromocaproyl chloride (47 g.) in acetone. The mixture was heated under reflux for one hour and then filtered hot. The filtrate was concentrated to dryness and the residue was recrystallised from aqueous alcohol (10% water v./v.). 6-methoxy - 8 - (6-bromocaproamido)quinoline formed needles of melting point 67–68.5°.

This amide and N-2-hydroxypropylpiperazine gave, by the methods of Example 5, 6-methoxy-8-[6-N'-(2-hydroxypropyl)piperazino - 1 - oxohexylamino]quinoline, which crystallised from benzene in white needles of melting point 126–127.5°, and 6-methoxy - 8 - [6-N'-(2-hydroxypropyl)piperazinohexylamino]quinoline. Distillation of the tetrahydrofuran solvent here left the product as a crystalline solid which after crystallisation from ethyl acetate melted at 108–110°. The trihydrochloride crystallised from ethanol in orange-yellow prisms, melting point 213–215° with decomposition.

*Example 7*

6-methoxy - 8 - (5-bromovaleramido)quinoline (14.9 g.), N-(3-hydroxybutyl)piperazine (7 g.) and triethylamine (5.3 g.) were dissolved in benzene (50 ml.), and the solution was heated under reflux for 16 hours. After cooling, the reaction mixture was extracted with 2 N acetic acid. The acid extract was made alkaline with 10 N sodium hydroxide and the liberated base was extracted with chloroform. The extract was washed with water, dried over anhydrous sodium sulphate, and evaporated. The product, 6-methoxy - 8 - [5-N'-(3-hydroxybutyl)-piperazino - 1 - oxopentylamino]quinoline, was thus obtained in good yield as a gum which slowly crystallised. It was characterised as the di(hydrogen maleate) which was prepared by mixing the constituents in hot ethyl acetate and recrystallised from alcohol, forming white crystals of melting point 169–170°. The foregoing amide (13.5 g.) in tetrahydrofuran (270 ml.) was added during 10 minutes to a stirred suspension of lithium aluminium hydride (2.5 g.) in tetrahydrofuran (50 ml.). The reaction mixture was heated under reflux with stirring for 2 hours, and then cooled in ice and cautiously decomposed with sodium hydroxide solution. The mixture was filtered and the filtrate was evaporated and distilled, the product boiling at 246–247° under 0.04 mm. The distillate was dissolved in three equivalents of N hydrochloric acid and the solution was evaporated to dryness under reduced pressure. The residue was recrystallised twice from alcohol forming deep yellow microscopic crystals of 6-methoxy - 8 - [5-N'-(3-hydroxybutyl)piperazinopentylamino]quinoline trihydrochloride, melting point 205–208° with decomposition.

*Example 8*

6-methoxy - 8 - [6-N'-(3-hydroxybutyl)piperazino-1-oxohexylamino]quinoline was prepared from 6-methoxy-8-(6-bromocaproamido)quinoline and N - (3 - hydroxybutyl)piperazine by the method of Example 7, being obtained as a gum which slowly set to a crystalline mass, melting point 85–95°. It was characterised as the di(hydrogen maleate) which crystallised from methanol, forming white crystals, melting point 169.5°. Reduction of this amide was effected by the method of Example 7. The product distilled at 252–255° under 0.2 mm. and was converted into the trihydrochloride which crystallised first from aqueous alcohol (2% water) and finally from methanol. 6-methoxy - 8 - [6-N'-(3-hydroxybutyl)piperazinohexylamino]quinoline trihydrochloride formed small deep yellow needles, melting point 219–221° with decomposition.

*Example 9*

6-ethoxy - 8 - aminoquinoline was condensed with 5-bromovaleryl chloride to give 6-ethoxy-8-(5-bromovaleramido)quinoline, melting point 84–86°. This amide and N-2-hydroxyethylpiperazine gave, by the methods of Example 5, 6-ethoxy - 8 - [5-N'-(2-hydroxyethyl)piperazino-1-oxopentylamino]quinoline, and 6 - ethoxy - 8 - [5-N'-(2-hydroxyethyl)piperazinopentylamino]quinoline, boiling point 250° at 0.05 mm. The trihydrochloride crystallised from ethanol in orange-yellow needles, melting point 228–230° with decomposition.

*Example 10*

Condensation of 5:6-dimethoxy - 8 - aminoquinoline and 3 chloropropionyl chloride yielded 5:6-dimethoxy-8-(3-chloropropionamido)quinoline which after crystallisation from ethanol melted at 119–120°. This amide and N-2-hydroxyethylpiperazine gave, by the methods of Example 5, 5:6-dimethoxy - 8 - [3-N'-(2-hydroxyethyl)-piperazino - 1 - oxopropylamino]quinoline, which after crystallisation from benzenecyclohexane melted at 102–104°, and 5:6-dimethoxy - 8 - [3-N'-(2-hydroxyethyl)-piperazinopropylamino]quinoline. The basic residue left after the evaporation of the tetrahydrofuran solvent was not distilled but was dissolved in N HCl. Evaporation of the solution under reduced pressure left a dark red gum which crystallised from ethanol in small brick-red needles which were hydrated and deliquescent and melted at 80°.

*Example 11*

6-methoxy-8-(6-bromocaproamido)quinoline (11.7 g.) and N-2-hydroxyethylpiperazine (6.5 g.) were condensed by the method of Example 5 to give 6-methoxy-8-[6-N'-(2 - hydroxyethyl)piperazino-1-oxohexylamino]quinoline. This amide crystallised from benzene in white solvated leaflets which melted at about 55°, resolidified, and then remelted at 98.5°. This amide (13.1 g.), dissolved in dry tetrahydrofuran (150 ml.), was added over 20 minutes to a boiling solution of lithium aluminium hydride (3.3 g.) in ether (150 ml.). The reaction mixture was stirred under reflux for four hours, and cooled. Water (4 ml.), 5 N NaOH (4 ml.), and finally water (10 ml.), were added dropwise and the mixture was stirred until excess lithium aluminium hydride had been completely decomposed. The ether-tetrahydrofuran solution was filtered from insoluble inorganic material and evaporated to dryness. The residual oil was distilled to give 6-methoxy-8-[6 - N'-(2-hydroxyethyl)piperazinohexylamino]quinoline, boiling point 270–278° at 0.15 mm. The trihydrochloride crystallised from aqueous ethanol (2.5% water by volume) in clumps of orange needles, melting at 218–220° with decomposition.

*Example 12*

A solution of N-2-hydroxyethylpiperazine (26 g.) in dimethylformamide (50 ml.) was added gradually to a solution of succinic anhydride (20 g.) in dimethylformamide (100 ml.) and the mixture was heated on the steam bath for 1 hour. The solution was cooled and 6-methoxy-8-aminoquinoline (17.4 g.) followed by N:N'-dicyclohexylcarbodiimide (41.2 g.), were added slowly with shaking. After 4 hours at room temperature, the solid was filtered off and the filtrate was evaporated to dryness. The residue was shaken with N-hydrochloric acid (300 ml.) and the filtered solution was made alkaline with sodium hydroxide ether (250 ml.) was added and the mixture was stirred vigorously for 30 minutes, during which time the insoluble oil was replaced by shining crystals. After thorough cooling, the solid was collected and washed with water and ether. Recrystallisation from ethyl acetate gave 6 - methoxy-8-[4-N'-(2 - hydroxyethyl)piperazino-1:4-dioxobutylamino]quinoline as colourless plates melting point 143–145°. This diamide (9.7 g.) was reduced with lithium aluminium hydride (3 g.) by the method of Example 3 to give 6-methoxy-8-[4-(N' - 2 - hydroxyethylpiperazino)butylamino]quinoline, boiling point 234–236° at 0.05 mm. The trihydrochloride crystallised from methanol as deep yellow needles, melting point 227° with effervescence, identical with the product of Example 3.

*Example 13*

To a boiling solution of piperazine hexahydrate (38.8 g.) in ethanol (170 ml.) containing hydrogen chloride (7.3 g.) was added dropwise ethyl chloroacetate (12.25 g.). The solution was refluxed for 6 hours. After cooling, the crystals of piperazine dihydrochloride were collected and washed with ethanol. The filtrate was evaporated to dryness, the residue was dissolved in a little water and excess solid potassium carbonate was added. The mixture was extracted several times with chloroform and the dried extract was evaporated. The residue was distilled to give N-ethoxycarbonylmethylpiperazine as a colourless liquid, boiling point 122–124°/11 mm. A solution of succinic anhydride (5 g.) and N-ethoxycarbonylmethylpiperazine (8.6 g.) in chloroform (100 ml.) was refluxed for 45 minutes. To the cooled solution was added 6-methoxy-8-aminoquinoline (8.7 g.) followed by N:N'-dicyclocarbodiimide (12.3 g.). After 4 hours' standing at room temperature, the solid was collected and washed with chloroform, and the total filtrate was evaporated to dryness. The residue was extracted with N hydrochloric acid, the solution was treated with charcoal, and then made alkaline with sodium hydroxide solution. The precipitated oil was extracted with chloroform, and the extract was washed with water, dried, and evaporated. The gummy residue was boiled with ether to give a colourless solid, which was collected and recrystallised from a small volume of methanol to give small colourless plates, melting point 92–93°, of 6-methoxy-8-[4-N'-ethoxycarbonylmethylpiperazino - 1,4 - dioxobutylamino]quinoline. This diamide (5.75 g.) in tetrahydrofuran (200 ml.) was reduced with lithium aluminium hydride (2.1 g.) during 3 hours' boiling as previously described. The product was finally distilled, to give 6-methoxy-8-[4-N'-(2-hydroxyethyl)piperazinobutylamino]quinoline, boiling point 236–242° at 0.06 mm. The trihydrochloride formed deep yellow plates, melting point 224–226°, identical with the product of Example 3.

*Example 14*

6-methoxy - 8 - (4-chlorobutyramido)quinoline (13.92 g.), N-ethoxycarbonylmethylpiperazine (8.6 g.), triethylamine (6.05 g.) and benzene (50 ml.) were heated under reflux for 15 hours. After cooling the reaction mixture was extracted with dilute acetic acid, and 6-methoxy-8-(4-N'-ethoxycarbonylmethylpiperazino - 1 - oxobutylamino)quinoline was liberated from the extract by alkali and isolated with chloroform. The basic amide was reduced by the method of Example 3 and the product, 6-methoxy-8-[4-N'-(2-hydroxyethyl)piperazinobutylamino]quinoline, was distilled and converted into the trihydrochloride, melting point 226–227°, identical with the product of Example 3.

*Example 15*

Anhydrous piperazine (10.3 g.) was dissolved in hot benzene (103 ml.) and 6-methoxy-8-(3-chloropropylamino)quinoline (5.74 g.) was slowly added. The mixture was heated under reflux for 22 hours, cooled and extracted with 2 N acetic acid. The extract was made alkaline with sodium hydroxide and the liberated oil was isolated with ether. The ether extract was washed four times with water, dried and evaporated. The residual base was dissolved in three equivalents of dilute hydrochloric acid, the solution was evaporated to dryness under reduced pressure, and the residue was crystallised from methanol. The product formed orange-yellow needles of 6-methoxy-8-(3-piperazinopropylamino)quinoline trihydrochloride, melting with decomposition at 232–233°.

6-methoxy-8-(3-piperazinopropylamino)quinoline (3.6 g.) and propylene oxide (1.06 g.) were stood in methanol (36 ml.) solution for 4 days. Evaporation of the solvent and distillation of the residue furnished a high yield of 6-methoxy-8-[3-N'-(2 - hydroxypropyl)piperazinopropylamino]quinoline, boiling point 241° at 0.09 mm. The base was dissolved in sufficient N HCl to form a trihydrochloride, and the residue left after evaporation of water was crystallised from ethanol containing 15% of water. The trihydrochloride formed deep yellow needles, melting point 238–240° with decomposition.

*Example 16*

6-methoxy-8-(4-chlorobutyramido)quinoline (22.4 g.) was added gradually to a warm stirred solution of anhydrous piperazine (28 g.) in dry benzene (300 ml.). The solid was filtered off and the benzene filtrate was washed with water (3 x 100 ml.). On cooling the aqueous extracts 6-methoxy-8-(4 - piperazino-1-oxobutylamino) quinoline hydrate separated as colourless needles. The hydrate was recrystallised from water. On drying in air the crystalline hydrate loses water, passing to the anhydrous amide which is initially oily but later solidifies. The hydrate was dried by azeotropic distillation with benzene to give the anhydrous amide, melting point 109–110°, which crystallised from light petroleum (boiling range 60–80°) in colourless plates, melting point 113°. The anhydrous amide is readily soluble in cold water and separates as an oil on heating. On standing the cold solution shortly deposits the crystalline hydrate. The amide was reduced by the method of Example 11 to 6-methoxy-8-(4-piperazinobutylamino)quinoline as a yellow viscous oil, melting point 218–224°/0.1 mm. The trihydrochloride crystallised from ethanol containing a very little water as orange plates of the dihydrate, melting point 259–260° after passing to the yellow anhydrous state at 170–171°.

A solution of 6-methoxy-8-(4-piperazinobutylamino) quinoline (2.5 g.) in methanol (25 ml.) was cooled to 0° and treated with ethylene oxide (0.52 g.). The solution was kept at room temperature for 5 days and then distilled. The product, 6-methoxy-8-[4-N'-(2-hydroxyethyl)piperazinobutylamino]quinoline, boiling point 232–235° at 0.02 mm., was converted into the trihydrochloride, melting point 226–227°, identical with the product of Example 3.

*Example 17*

6-methoxy-8-[3-N'-(2 - hydroxypropyl)piperazinopropylamino]quinoline trihydrochloride (3 g.), prepared according to Example 15, water (9 ml.) and concentrated hydrochloric acid (6 ml.) were heated under reflux for 6 hours. Evaporation of the solution to dryness left a red gum which was crystallised from ethanol. Small orange-yellow needles separated of 6-hydroxy-8-[3-N'-hydroxypropyl)-piperazinopropylamino]quinoline trihydrochloride of melting point 216–218° with decomposition.

6-methoxy-8-[5-N' - hydroxypropyl)piperazinopentylamino]quinoline trihydrochloride (3 g.), prepared according to Example 5, concentrated hydrochloric acid (6 ml.) and water (9 ml.) were heated under reflux for 7 hours. The solution was concentrated to dryness and the residual gum was crystallised from aqueous ethanol (1% water by volume) forming small yellow needles of 6-hydroxy-8-[5 - N' - (2-hydroxypropyl)piperazinopentylamino]quinoline trihydrochloride, melting point 204.5–206.5°.

6-hydroxy-8 - [5-N'-(2-hydroxyethyl)piperazinopentylamino]quinoline trihydrochloride, melting point 178–180°, was obtained similarly from 6-methoxy-8-[5-N'-(2-hydroxyethyl)-piperazinopentylamino]quinoline trihydrochloride, prepared according to Example 5.

What we claim is:

1. A compound selected from the class consisting of the bases of the Formula I and their acid addition salts containing pharmaceutically acceptable non-toxic anions,

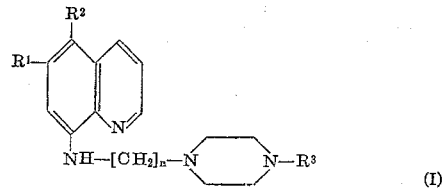

(I)

in which formula $R^1$ is selected from the class consisting of methoxy, ethoxy and hydroxy, $R^2$ is selected from the class consisting of hydrogen, methoxy and hydroxy, $R^3$ is selected from the class consisting of 2-hydroxyethyl, 2-hydroxypropyl, 3-hydroxypropyl and 3-hydroxybutyl, and $n$ is an integer from 3 to 6.

2. A method for the manufacture of 8-aminoalkylaminoquinoline which comprises reducing 8-(4-amino-α-ω-dioxoalkylamino)quinoline with an excess of lithium aluminum hydride.

3. A method for the manufacture of 8-aminobutylaminoquinoline which comprises reducing 8-(4-amino- 1:4-dioxobutylamino)quinoline with an excess of lithium aluminum hydride.

4. A pharmaceutically acceptable acid addition salt of 6-methoxy-8-(6-N'-(3-hydroxybutyl)piperazinohexylamino)quinoline.

5. A pharmaceutically acceptable acid addition salt of 5:6-dimethoxy-8-(3-N'-(2-hydroxyethyl)piperazinopropylamino)quinoline.

6. 6-methoxy-8-(6-N'-(3-hydroxybutyl)piperazinohexylamino)quinoline.

7. A pharmaceutically acceptable acid addition salt of 6-methoxy-8-(4-N'-(2-hydroxyethyl)piperazinobutylamino)quinoline.

8. A pharmaceutically acceptable acid addition salt of 6-methoxy-8-(5-N'-(3-hydroxybutyl)piperazinopentylamino)quinoline.

9. A pharmaceutically acceptable acid addition salt of 6-methoxy-8-(5-N'-(2-hydroxyethyl)piperazinopentylamino)quinoline.

10. A pharmaceutically acceptable acid addition salt of 6-methoxy-8-(3-N'-(2-hydroxypropyl)piperazinopropylamino)quinoline.

11. A pharmaceutically acceptable acid addition salt of 6-methoxy-8-(6-N'-(2-hydroxypropyl)piperazinohexylamino)quinoline.

References Cited in the file of this patent

Kitchen et al.: Journal Organic Chemistry, volume 8, pages 337–340 (1943).